(12) United States Patent
Minematsu

(10) Patent No.: US 9,432,181 B2
(45) Date of Patent: Aug. 30, 2016

(54) DEVICE, METHOD, AND PROGRAM FOR FORMAT-PRESERVING ENCRYPTION, AND DEVICE, METHOD, AND PROGRAM FOR DECRYPTION

(71) Applicant: NEC CORPORATION, Minato-ku, Tokyo (JP)

(72) Inventor: Kazuhiko Minematsu, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/396,633

(22) PCT Filed: Apr. 24, 2013

(86) PCT No.: PCT/JP2013/061972
§ 371 (c)(1),
(2) Date: Oct. 23, 2014

(87) PCT Pub. No.: WO2013/161841
PCT Pub. Date: Oct. 31, 2013

(65) Prior Publication Data
US 2015/0341166 A1  Nov. 26, 2015

(30) Foreign Application Priority Data

Apr. 24, 2012 (JP) .................. 2012-098403

(51) Int. Cl.
*H04L 9/06* (2006.01)

(52) U.S. Cl.
CPC ........... *H04L 9/0625* (2013.01); *H04L 9/0631* (2013.01)

(58) Field of Classification Search
CPC ..................... H04L 9/0625; H04L 9/0631
See application file for complete search history.

(56) References Cited

U.S. PATENT DOCUMENTS

| 8,600,048 B1 * | 12/2013 | Hansen ................... G06F 21/62 380/28 |
| 2007/0081668 A1 * | 4/2007 | McGrew ............... H04L 9/0637 380/37 |

(Continued)

FOREIGN PATENT DOCUMENTS

| JP | 2007-518294 A | 7/2007 |
| JP | WO2008/018303 A1 | 2/2008 |

(Continued)

OTHER PUBLICATIONS

Liu et al., Format-preserving encryption for DateTime, Oct. 2010, IEEE International Conference on Intelligent Computing and Intelligent Systems, pp. 201-205.*

(Continued)

*Primary Examiner* — Kenneth Chang
(74) *Attorney, Agent, or Firm* — Sughrue Mion, PLLC

(57) ABSTRACT

[Subject] To provide a format-preserving encryption device and the like that enables efficient and secure encryption/decryption while maintaining the data format.

[Solution] An encryption device 10 includes: an unit block tweakable encryption module 101 that encrypts a specific digit of a plain text by using numerical values of remaining respective digits excluding the specific digit of the plain text and an external tweak that is input concurrently with the plain text; a block permutation module 102 that permutates respective digits including the encrypted specific digit of the plain text per digit based on a predetermined rule; and a counter update module 103 that causes processing by the unit block tweakable encryption unit and the block permutation unit to repeat for a predetermined number of times. A decryption device 20 performs the reverse processing to the encryption device 10.

9 Claims, 6 Drawing Sheets

(56) References Cited

U.S. PATENT DOCUMENTS

| | | | |
|---|---|---|---|
| 2008/0170693 A1 | 7/2008 | Spies et al. | |
| 2009/0310778 A1* | 12/2009 | Mueller | G06Q 20/3823 380/44 |
| 2010/0002873 A1* | 1/2010 | Ferguson | H04L 9/0637 380/28 |
| 2010/0246813 A1* | 9/2010 | Morris | H04L 9/0631 380/28 |
| 2010/0318468 A1* | 12/2010 | Carr | G06Q 20/027 705/79 |
| 2011/0280394 A1 | 11/2011 | Hoover | |

FOREIGN PATENT DOCUMENTS

| | | |
|---|---|---|
| JP | 2009-48636 A | 3/2009 |
| JP | WO2009/128370 A1 | 10/2009 |
| JP | 2010-129089 A | 6/2010 |
| WO | 2009/032858 A2 | 3/2009 |

OTHER PUBLICATIONS

Mihir Bellare, et al., "Format-Preserving Encryption", Format-Preserving Encryption, Lecture Notes in Computer Science, SAC, 2009, pp. 295-312.

Louis Granboulan, et al., "Pseudorandom permutation families over abelian groups", In Fast Software Encryption, 2006, Springer-Verlag, pp. 57-77, vol. 4047 of LNCS.

Thomas Baigneres, et al., "Linear Cryptanalysis of Non Binary Ciphers with an Application to SAFER", Selected Areas in Cryptography, 2007, pp. 184-211.

John Black, et al., "Ciphers with Arbitrary Finite Domains", CT-RSA 2002, The Cryptographer's Track at the RSA Conference, 2002, San Jose, CA, USA, Proceedings. Lecture Notes in Computer Science 2271, Feb. 18-22, 2002, pp. 114-130.

Mihir Bellare, et al., "The FFX Mode of Operation for Format-Preserving Encryption", NIST Submission, Feb. 20, 2010, pp. 1-18. URL : http://csrc.nist.gov/groups/ST/toolkit/BCM/documents/proposedmodes/ffx/ffx-spec.pdf.

Moses Liskov, et al., "Tweakable Block Ciphers", Advances in Cryptology—CRYPTO 2002, 22nd Annual International Cryptology Conference, Santa Barbara, California, USA, Proceedings. Lecture Notes in Computer Science 2442 Springer 2002, Aug. 18-22, 2002, pp. 31-46.

Kazuhiko Minematsu, "Beyond-birthday-bound Security Based on Tweakable Block Cipher", Fast Software Encryption, 16th International Workshop, FSE 2009, Leuven, Belgium, Revised Selected Papers. Lecture Notes in Computer Science 5665, Feb. 22-25, 2009, pp. 308-326.

Kazuhiko Minematsu, et al., "Building Blockcipher from Tweakable Blockcipher: Extending FSE 2009 Proposal", Liqun Chen (Ed.): Cryptography and Coding—13th IMA International Conference, IMACC 2011, Oxford, UK, Proceedings, Lecture Notesin Computer Science 7089 Springer 2011, Dec. 12-15, 2011, pp. 391-412.

Louis Granboulan, et al., "Perfect Block Ciphers with Small Blocks", Alex Biryukov (Ed.): Fast Software Encryption, 14th International Workshop, FSE 2007, Luxembourg, Luxembourg, Revised Selected Papers. Lecture Notes in Computer Science 4593 Springer 2007, Mar. 26-28, 2007, pp. 452-465.

Christophe De Canniere, et al., "KATAN & KTANTAN—A Family of Small and Efficient Hardware-Oriented Block Ciphers", Cryptographic Hardware and Embedded Systems—CHES 2009, 11th International Workshop, Lausanne, Switzerland, Proceedings. Lecture Notes in Computer Science 5747 Springer 2009, Sep. 6-9, 2009, pp. 272-288.

Ronald L. Rivest, "The RC5 Encryption Algorithm", In the Proceedings of the Second International Workshop on Fast Software Encryption (FSE), 1994, pp. 86-96.

Francois-Xavier Standaert, et al., "SEA: a Scalable Encryption Algorithm for Small Embedded Applications", in the Proceedings of CARDIS 2006, LNCS, Tarragona, Spain, Apr. 2006, pp. 222-236, vol. 3928.

International Search Report of PCT/JP2013/061972, dated Jun. 11, 2013. [PCT/ISA/210].

Communication dated Nov. 27, 2015, from the European Patent Office in counterpart European Application No. 13782499.1.

Yuliang Zheng et al: "The SPEED cipher" In: "Grid and cooperative computer—GCC 2004: third international conference, Wuhan, China, Oct. 21-24, 2004 In: Lecture notes in computer science, ISSN 0302-9743: vol. 3251". Jan. 1, 1997, Springer Verlag, DE 032548, XP055228722, ISSN: 0302-9743. ISBN: 978-3-642-36699-4. vol. 1318, pp. 71-89, DOI: 10.1007/3-540-63597-7; 19 pages.

* cited by examiner

DEVICE, METHOD, AND PROGRAM FOR FORMAT-PRESERVING ENCRYPTION, AND DEVICE, METHOD, AND PROGRAM FOR DECRYPTION

CROSS REFERENCE TO RELATED APPLICATIONS

This application is a National Stage of International Application No. PCT/JP2013/061972filed Apr. 24, 2013, claiming priority based on Japanese Patent Application No. 2012-098403, filed Apr. 24, 2012, the contents of all of which are incorporated herein by reference in their entirety.

TECHNICAL FIELD

The present invention relates to a device, a method, and a program for format-preserving encryption, and a device, a method, and a program for decryption. In particular, the present invention relates to a format-preserving encryption device and the like that is applicable to a case where a message space is a non-binary space or a binary space that is shorter than a block length of a general block cipher.

BACKGROUND ART

Almost every company has a large amount of confidential data used in business in a computer system. Such data are important in conducting business and, moreover, must not be leaked outside by any means from a perspective of personal information protection. Therefore, while data encryption is required for a business system to be newly constructed as a matter of course, an existing business system that does not support encryption is also demanded to have an additional function for storing data with encryption.

However, in an existing business system, a data format is often determined in advance. For example, a credit card number is one of typical examples of serious personal information with high necessity of protection, for which a data format of "decimal 16 digits" is defined in advance. In an existing business system, data other than the defined format is often treated as an error and not able to be processed. The same goes to a telephone number, a postal code, a bank account number, and the like.

Thus, required is an encryption method in which a data format of a plain text matches a data format of a cipher text that is encrypted therefrom. Such an encryption method is referred to as format-preserving encryption. Likewise, a decryption method in which a data format of a cipher text matches a data format of a plain text is referred to as format-preserving decryption. Utilizing the format-preserving encryption/decryption, a data encryption/decryption function can be added to an existing business system with a minimum change to the system.

In a general encryption method (block cipher), messages (a plain text and a cipher text) are expressed in binary spaces of the same format. For example, messages of Data Encryption Standard (DES) and Advanced Encryption Standard (AES), as known encryption methods, are respectively 64 bits and 128 bits. On the contrary, the format-preserving encryption deals with data such as "64-bit or less binary space" and "non-binary space (for example, decimal, or a combination of binary and decimal)."

Such a format-preserving encryption is disclosed, for example, in the following technical literature. NPL1 is an article that popularized the name of format-preserving encryption across the world. NPL2 describes Knuth Shuffle, also known as Fisher-Yates Shuffle, as a method of realizing a safe block cipher, in principle, in any message spaces. However, the calculation amount and memory amount are in a linear order to a message space, whereby the amount of processing tends to be vast. Thus, Knuth Shuffle is difficult to be applied to a message space of more than 10,000 in size.

NPL3 describes a block cipher that specifically deals with a case where messages are in a decimal space. NPL4 describes attacks to the cipher method of NPL3.

NPL5 describes a method of realizing a block cipher in a binary space or non-binary space of n-bit or less using an n-bit block cipher. The method described in NLP5 causes a problem in which the method is efficient and secure when a size of the target message space is slightly smaller than 2n, while either efficiency or security significantly decreases when the size becomes smaller than 2n by a certain amount.

In the same way as NPL5, NPL6 also describes a method in which permutation processing called Feistel permutation is realized using a block cipher and encryption is performed by repeating this permutation processing on a plain text for a predetermined number of times. The above-described NPL1 also describes the same method.

FIG. 6 is an explanatory diagram illustrating an overview of the encryption method described in NPL6. FIG. 6 illustrates processing for one cycle of permutation processing. Having $X_{m+1}, \ldots, X_d$, a round counter ctr, an external tweak gt, and the number of digits of a plain text d as input values, an AES encryptor 901 outputs an encrypted value (128 bits) by encrypting the input values by an AES encryption method. A modulo 902 outputs a remainder of division of the output value from the AES encryptor 901 by $a^m$ (m power of a). An adder 903 outputs a value obtained by adding $X_1, \ldots, X_m$ and the output value from the modulo 902. Then, after replacing the output from the adder 903 with $X_{m+1}, \ldots, X_d$, one cycle of the permutation processing completes. This processing is repeated for a predetermined number of times.

NPL7 describes a tweakable block cipher that is a block cipher method using an auxiliary parameter called tweak for encryption and decryption. NPL8 and 9 describe block ciphers in a variety of message spaces that are realized utilizing the tweakable block cipher. These methods can guarantee relatively high efficiency and security when the tweakable block cipher is secure.

Further, there is also described a method of realizing a tweakable block cipher of n-bit block based on an n-bit block cipher. Therefore, a method of creating a 2n-bit block cipher based on an n-bit block cipher can be obtained from the method described in NPL8, and a method of creating an n+1-bit or more block cipher based on an n-bit block cipher can be obtained from the method described in NPL9.

According to the methods described in NPL8 and 9, depending on a parameter, format-preserving encryption can be realized with higher efficiency and security than a method combining Feistel permutation and a block cipher as described in NPL1 and 6. NPL10 to 13 will be described later herein.

PTL1 describes a technique for protecting data stored in a database from traffic analysis. PTL2 describes a technique for changing a character set of data stored in a database to obfuscate the data. PTL3 to 4 describe a block encryption method that utilizes an external tweak (an adjustment value), which are patent applications corresponding to the above-described NPL8 and 9. PTL5 describes a technique for performing encryption while maintaining a format of an MPEG4 file.

CITATION LIST

Patent Literature

[PTL 1]: Japanese Unexamined Patent Application Publication No. 2009-048636
[PTL 2]: Japanese Unexamined Patent Application Publication No. 2010-129089
[PTL 3]: Re-publication of PCT International Publication No. WO2008018303
[PTL 4]: Re-publication of PCT International Publication No. WO2009128370
[PTL 5]: Japanese Translation of PCT International Application Publication No. 2007-518294

Non Patent Literature

[NPL 1]: Mihir Bellare, Thomas Ristenpart, Phillip Rogaway, Till Stegers: Format-Preserving Encryption. SAC 2009, pp. 295-312.
[NPL 2]: Fisher-Yates shuffle. URL: http://en.wikipedia.org/wiki/Fisher%E2%80%93Yates_shuffle
[NPL 3]: L. Granboulan, E. Levieil, and G. Piret. Pseudorandom permutation families over Abelian groups. Fast Software Encryption 2006, volume 4047 of LNCS, pages 57-77. Springer-Verlag, 2006.
[NPL 4]: Thomas Baigneres, Jacques Stern, Serge Vaudenay: Linear Cryptanalysis of Non Binary Ciphers. Selected Areas in Cryptography 2007: pp. 184-211
[NPL 5]: John Black and Phillip Rogaway. Ciphers with Arbitrary Finite Domains. CT-RSA 2002, The Cryptographer's Track at the RSA Conference, 2002, San Jose, Calif., USA, Feb. 18-22, 2002, Proceedings. Lecture Notes in Computer Science 2271, pp. 114-130.
[NPL 6]: M. Bellare, P. Rogaway, T. Spies. Format-preserving Feistel-based Encryption Mode, NIST Submission, URL: http://csrc.nist.gov/groups/ST/toolkit/BCM/documents/proposedmodes/ffx/ffx-spec.pdf.
[NPL 7]: M. Liskov, R. Rivest, D. Wagner, Tweakable Block Ciphers, Advances in Cryptology—CRYPTO 2002, 22nd Annual International Cryptology Conference, Santa Barbara, Calif., USA, August 18-22, 2002, Proceedings. Lecture Notes in Computer Science 2442 Springer 2002, pp. 31-46.
[NPL 8]: Kazuhiko Minematsu: Beyond-Birthday-Bound Security Based on Tweakable Block Cipher. Fast Software Encryption, 16th International Workshop, FSE 2009, Leuven, Belgium, Feb. 22-25, 2009, Revised Selected Papers. Lecture Notes in Computer Science 5665, pp. 308-326.
[NPL 9]: Kazuhiko Minematsu, Tetsu Iwata: Building Blockcipher from Tweakable Blockcipher: Extending FSE 2009 Proposal. Liqun Chen (Ed.): Cryptography and Coding—13th IMA International Conference, IMACC 2011, Oxford, UK, Dec. 12-15, 2011. Proceedings. Lecture Notes in Computer Science 7089 Springer 2011, pp. 391-412.
[NPL 10]: L. Granboulan and T. Pornin. Perfect Block Ciphers with Small Blocks. Alex Biryukov (Ed.): Fast Software Encryption, 14th International Workshop, FSE 2007, Luxembourg, Luxembourg, Mar. 26-28, 2007, Revised Selected Papers. Lecture Notes in Computer Science 4593 Springer 2007, pp. 452-465.
[NPL 11] : C. D. Cannière and O. Dunkelman and M. Knezevi'c, Christophe Clavier, Kris Gaj (Eds.), KATAN & amp; KTANTAN —A Family of Small and Efficient Hardware-Oriented Block Ciphers: Cryptographic Hardware and Embedded Systems —CHES 2009, 11th International Workshop, Lausanne, Switzerland, Sep. 6-9, 2009, Proceedings. Lecture Notes in Computer Science 5747 Springer 2009. pp. 272-288.
[NPL 12]: Rivest, R. L. (1994). The RC5 Encryption Algorithm. In the Proceedings of the Second International Workshop on Fast Software Encryption (FSE) 1994, pp. 86-96.
[NPL 13]: F.-X. Standaert, G. Piret, N. Gershenfeld, and J.-J Quisquater. SEA: A Scalable Encryption Algorithm for Small Embedded Applications, in the Proceedings of CARDIS 2006, LNCS, vol 3928, pp 222-236, Tarragona, Spain, April 2006.

SUMMARY OF INVENTION

Technical Problem

As described above, according to the methods as described in NPL8 and 9 (and PLT3 and 4), it is possible to realize efficient and highly secure format-preserving encryption. However, such methods realize a block size that is larger than n bits using an n-bit block cipher. Therefore, the methods are not applicable to all message spaces.

In particular, such methods are inapplicable when a message space is a decimal space, or when a bit size is smaller than n bits (typically, 128 bits in AES). The methods described in NPL5 and 6 are applicable even to a decimal message space, while the methods have a problem in efficiency and security as described above. Other techniques described in PTL1 to 5 and NPL1 to 13 neither solve such a problem.

The objective of the present invention is to provide a device, a method, and a program for format-preserving encryption and a device, a method, and a program for decryption that enable efficient and secure encryption/decryption while maintaining a format such as an input length and a character set, even when the message space is a non-binary space or the message space is a binary space that is shorter than a block length of a general block cipher.

Solution to Problem

To achieve the above objective, a format-preserving encryption device according to the present invention is a format-preserving encryption device that encrypts an input plain text and outputs a cipher text in the same data format as the plain text, including: a unit block tweakable encryption unit for encrypting a specific digit of the plain text by using numerical values of remaining respective digits excluding the specific digit of the plain text and an external tweak that is input concurrently with the plain text; a block permutation unit for permutating respective digits including the encrypted specific digit of the plain text per digit based on a predetermined rule; and an encryption counter update unit for causing processing by the unit block tweakable encryption unit and the block permutation unit to repeat for a predetermined number of times.

To achieve the above objective, a format-preserving decryption device according to the present invention is a format-preserving decryption device that decrypts a cipher text that is output from the format-preserving encryption device and outputs a plain text in the same data format as the cipher text, including: a unit block tweakable decryption unit for decrypting a specific digit of the cipher text, which is at the same position as the unit block tweakable encryption unit, by using numerical values of remaining digits excluding the specific digit of the cipher text and an external tweak that is the same as the one used by the encryption device and is input concurrently with the cipher text; a block reverse permutation unit for permutating respective digits including the decrypted specific digit of the cipher text per digit based on a reverse rule to the block permutation unit; and a decryption counter update unit for causing processing by the unit block tweakable decryption unit and the block reverse permutation unit to repeat for the same number of times as the encryption counter update unit.

To achieve the above objective, of the format-preserving encryption device that encrypts an input plain text and outputs a cipher text in the same data format as the plain text, a format-preserving encryption method according to the present invention includes: encrypting, by a unit block tweakable encryption unit, a leftmost digit of the plain text by using numerical values of remaining respective digits excluding the leftmost digit of the plain text and an external tweak that is input concurrently with the plain text; permutating, by a block permutation unit, remaining respective digits excluding the leftmost digit of the plain text and the encrypted leftmost digit of the plain text per digit based on a predetermined rule; and, causing, by a counter update unit, processing of the encryption of the leftmost digit of the plain text and the permutation per digit to repeat for a predetermined number of times.

To achieve the above objective, of the format-preserving decryption device that decrypts an input cipher text and outputs a plain text in the same data format as the cipher text, a format-preserving decryption method according to the present invention includes: decrypting, by a unit block tweakable decryption unit, a leftmost digit of the cipher text by using numerical values of remaining respective digits excluding the leftmost digit of the cipher text and an external tweak that is input concurrently with the cipher text; reverse permutating, by a block reverse permutation unit, remaining respective digits excluding the leftmost digit of the cipher text and the decrypted leftmost digit of the cipher text per digit based on a predetermined rule; and causing, by a counter update unit, processing of the decryption of the leftmost digit of the cipher text and the reverse permutation per digit to repeat for a predetermined number of times.

To achieve the above objective, in the format-preserving encryption device that encrypts an input plain text and outputs a cipher text in the same data format as the plain text, a format-preserving encryption program according to the present invention causes a computer provided in the format-preserving encryption device to execute procedures of: encrypting a leftmost digit of the plain text by using numerical values of remaining respective digits excluding the leftmost digit of the plain text and an external tweak that is input concurrently with the plain text; permutating remaining respective digits excluding the leftmost digit of the plain text and the encrypted leftmost digit of the plain text per digit based on a predetermined rule; and causing processing of the encryption of the leftmost digit of the plain text and the permutation per digit to repeat for a predetermined number of times.

To achieve the above objective, in the format-preserving decryption device that decrypts an input cipher text and outputs a plain text in the same data format as the cipher text, a format-preserving decryption program according to the present invention causes a computer provided in the format-preserving decryption device to execute procedures of: decrypting a leftmost digit of the cipher text by using numerical values of remaining respective digits excluding the leftmost digit of the cipher text and an external tweak that is input concurrently with the cipher text; reverse permutating remaining respective digits excluding the leftmost digit of the cipher text and the decrypted leftmost digit of the cipher text per digit based on a predetermined rule; and causing processing of the decryption of the leftmost digit of the cipher text and the reverse permutation per digit to repeat for a predetermined number of times.

Advantageous Effects of Invention

As described above, the present invention performs encryption by repeating processing of encrypting a specific digit of a plain text and replacing respective digits, and performs decryption by the reverse processing, thereby enabling efficient and secure encryption/decryption processing regardless of the number of digits and even in other number than binary.

As such, the present invention can provide a device, a method, and a program for format-preserving encryption and a device, a method, and a program for decryption that has a superior feature of enabling efficient and secure encryption/decryption while maintaining a format such as an input length and a character set, even when the message space is a non-binary space or the message space is a binary space that is shorter than a block length of a general block cipher.

DESCRIPTION OF EMBODIMENTS

Embodiments

Figure 1:
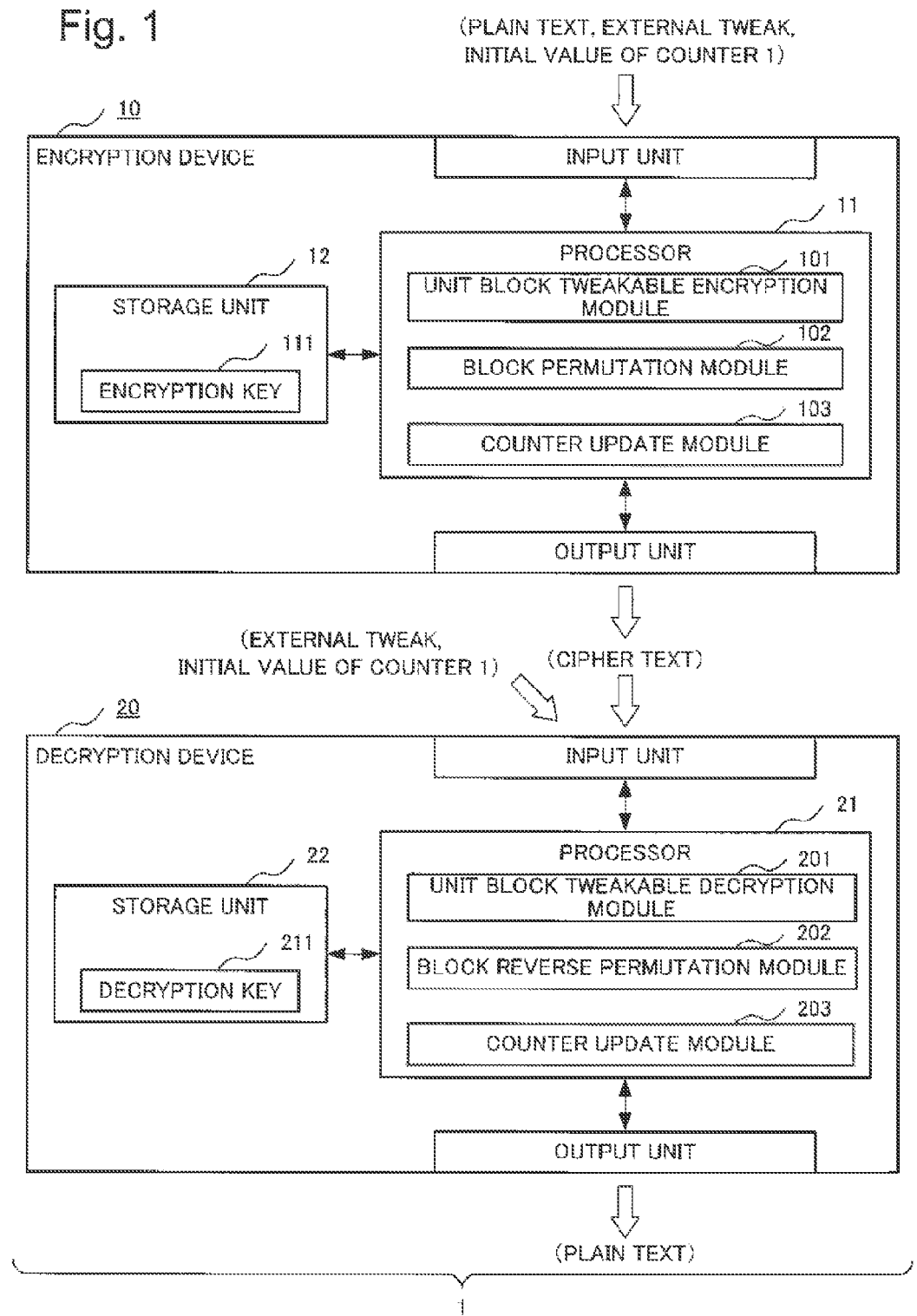
FIG. 1 is an explanatory diagram illustrating a configuration of an encryption system according to an exemplary embodiment of the present invention.

The following will describe a configuration of an exemplary embodiment of the present invention based on the accompanying FIG. 1.

First, basic contents of the exemplary embodiment will be described, then, more specific contents thereof will be described next. A format-preserving encryption device (an encryption device 10) according to the exemplary embodiment is an encryption device that encrypts an input plain text and outputs a cipher text in the same data format as the plain text.

The encryption device 10 includes a unit block tweakable encryption module 101, a block permutation module 102, and an encryption counter update module 103. The unit block tweakable encryption module 101 encrypts a specific digit of a plain text by using numerical values of remaining respective digits excluding the specific digit of the plain text and an external tweak that is input concurrently with the plain text. The block permutation module 102 permutates the respective digits including the encrypted specific digit of the plain text per digit based on a predetermined rule. The encryption counter update module 103 causes processing by the unit block tweakable encryption unit and the block permutation unit to repeat for a predetermined number of times.

Further, the unit block tweakable encryption module 101 includes an AES encryptor 101a, a temporary encryption key generator 101b, and a block encryptor 101c. The AES encryptor 101a encrypts a numerical value obtained by concatenating remaining respective digits excluding the specific digit of the plain text and an external tweak using a prestored encryption key, and outputs an output value of a specific number of bits. The temporary encryption key generator 101b generates a temporary encryption key using the output value of the AES encryptor. The block encryptor 101c encrypts the specific digit of the plain text utilizing the temporary encryption key.

The block encryptor 101c encrypts the specific digit of the plain text by permutation using Knuth Shuffle. Then, the block permutation module 102 carries remaining respective digits excluding the leftmost digit of the plain text by one digit, and moves the leftmost digit to a rightmost position.

A format-preserving decryption device (a decryption device 20) according to the exemplary embodiment is a decryption device that decrypts the cipher text output from the encryption device 10 and outputs a plain text in the same data format as the cipher text.

The decryption device 20 includes a unit block tweakable decryption module 201, a block reverse permutation module 202, and a decryption counter update module 203. The unit block tweakable decryption module 201 decrypts a specific digit of the cipher text, which is at the same position as the unit block tweakable encryption module 101, using numerical values of remaining respective digits excluding the specific digit of the cipher text and an external tweak that is the same as the one used by the encryption device and is input concurrently with the cipher text. The block reverse permutation module 202 permutates the respective digits including the decrypted specific digit of the cipher text per digit based on a reverse rule to the block permutation module 102. The decryption counter update module 203 causes processing by the unit block tweakable decryption unit and the block reverse permutation unit to repeat for the same number of times as the encryption counter update unit.

Further, the unit block tweakable decryption module 201 includes an AES decryptor, a temporary decryption key generator, and a block decryptor. The AES decryptor decrypts a numerical value obtained by concatenating remaining respective digits excluding the specific digit of the cipher text and an external tweak using a prestored decryption key and outputs an output value of a specific number of bits. The temporary decryption key generator generates a temporary decryption key using the output value of the AES decryptor. The block decryptor decrypts the specific digit of the cipher text utilizing the temporary decryption key.

Having such a configuration, the encryption device 10 and the decryption device 20 can efficiently and securely perform encryption/decryption while maintaining a format such as an input length and a character set, even when the message space is a non-binary space or the message space is a binary space that is shorter than a block length of a general block cipher.

The following will describe further details.

FIG. 1 is an explanatory diagram illustrating a configuration of the encryption system 1 according to the exemplary embodiment of the present invention. The encryption system 1 is configured by the encryption device 10 and the decryption device 20. The encryption device 10 encrypts an input plain text and outputs a cipher text. The decryption device 20 decrypts an input cipher text and outputs a plain text.

The encryption device 10 includes a configuration as a general computer device. In other words, a client terminal 10 includes a processor 11 as a main unit of executing a computer program, a storage unit 12 that stores data, an input unit 13 (typically, a keyboard and the like) that accepts an operation from a user, and an output unit 14 (typically, a display, a printer, and the like) that presents a processing result to a user.

Likewise, the decryption device 20 includes a configuration as a general computer device. That is, the decryption device 20 also includes a processor 21, a storage unit 22, an input unit 23, and an output unit 24, in the same way as the encryption device 10. The configuration and operation thereof will be described later herein.

(Configuration of Encryption Device)

The processor 11 operates as an unit block tweakable encryption module 101, a block permutation module 102, and a counter update module 103 respectively, as will be described later herein, by an operation of an encryption program. Further, the storage unit 12 prestores an encryption key 111.

Through the input unit 13, a d-digit plain text in base a as a target of encryption, an external tweak, and an initial value of a round counter=1 are input. The following Formula 1 is established for a (i) and a message space MSG. In other words, the message space MSG is a d-digit space in base a.

$$a(i)=a \text{ for } i=1, \ldots, a$$

$$MSG=Z_{a(1)} \times Z_{a(2)} \times \ldots \times Z_{a(d)} = (Z_a)^d \quad \text{[Formula 1]}$$

The external tweak can be added as necessary by a user. For example, a d-digit binary expression of a plain text, an ID of a private key in use, processing time and date, a serial number of the encryption device 10, and the like can be used as an external tweak. However, upon decryption of the output cipher text, the external tweak used in the encryption processing needs to be uniquely calculated. Unless such a condition is satisfied, the external tweak is not to be added.

The unit block tweakable encryption module 101 encrypts X[1] using, as an input, d-digit X=(X[1], . . . , X[d]) in base a, the external tweak, and the round counter that are input as above. X[1] represents one digit number in base a. When a value of the round counter is the initial value 1, the above X corresponds to a plain text. For encryption of X[1], as indicated in the following Formula 2, an encryption function TE of a tweakable block cipher is used with one digit in base a as a block. M represents a plain text, K represents an encryption key 111, and T represents a tweak. Spaces that M and C take are both one-digit space in base a.

$$C=TE(K,T,M) \quad \text{[Formula 2]}$$

More specifically, encryption by the unit block tweakable encryption module 101 outputs an output value of (V, X[2], . . . , X[d]) after performing an operation indicated in the following Formula 3, in which the external tweak is defined as gt and the round counter is defined as ctr.

$$V=TE(K,(ctr,gt,X[2], \ldots, X[d]),X[1]) \quad \text{[Formula 3]}$$

That is, the unit block tweakable encryption module 101 concatenates the output value V, as a result of encrypting X[1] using the external tweak gt, the round counter ctr, and d-1 digits from the right end of the input value (X[2], . . . , X[d]) as a tweak of TE, with (X[2], ..., X[d]), and outputs the concatenation as an output value.

TE can be generally expressed as indicated in the following Formula 4. In Formula 4, KeyGen is a function that generates a temporary key DK using a private key K and (ctr, gt, X[2], ..., X[d]) as input values. BlockEnc is a function that encrypts X[1] utilizing the temporary key DK.

$$V=\text{BlockEnc}(DK,X[1])$$

$$DK=\text{KeyGen}(K(ctr,gt,X[2],\ldots,X[d])) \quad \text{[Formula 4]}$$

(Unit Block Tweakable Encryption Unit Using AES Encryption Method)

The following will consider actual processing of the above-described KeyGen and BlockEnc, when a=10 (that is, decimal) and a sequence obtained by concatenating a round counter, an external tweak, and X[1], ..., X[d-1] can be expressed by 128 bits or less, using known Advanced Encryption Standard (AES) encryption method.

Figure 2:
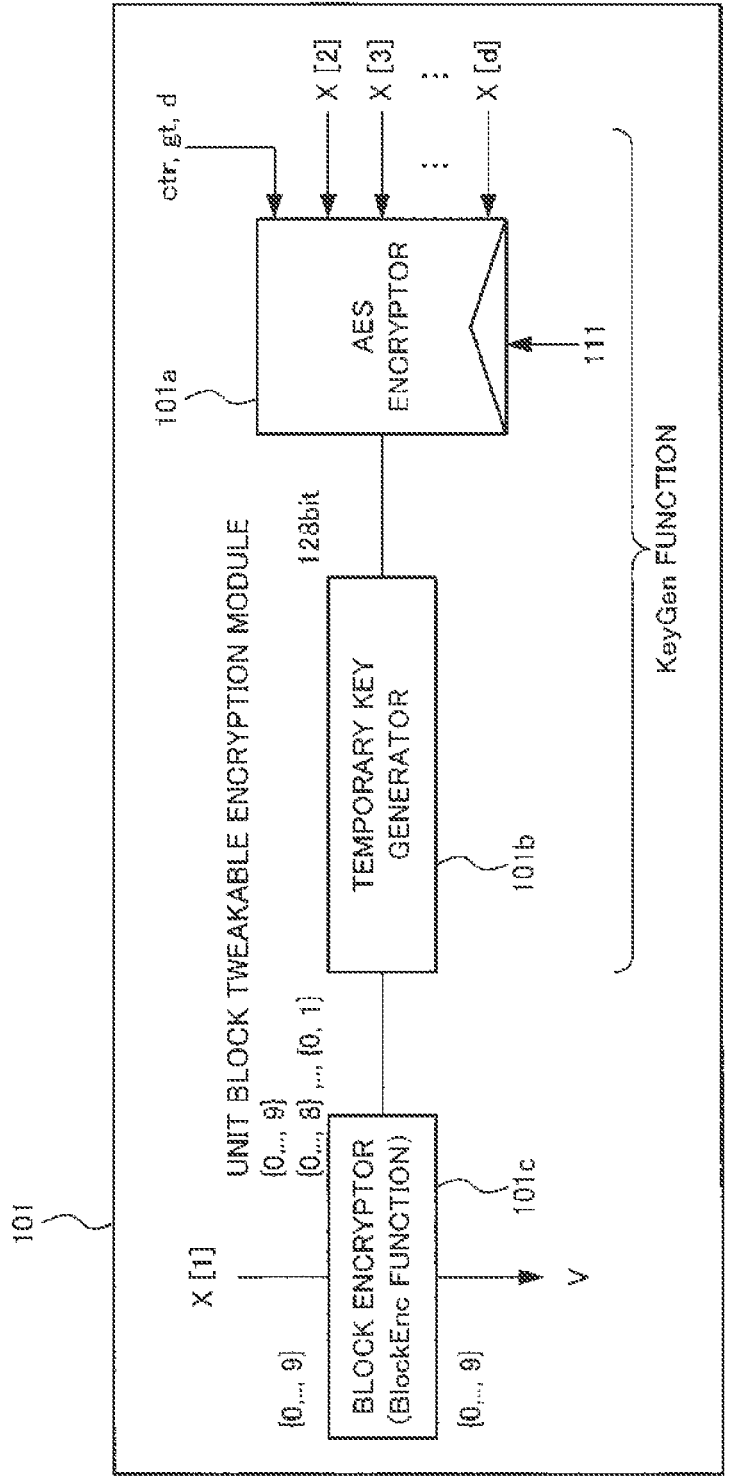
FIG. 2 is an explanatory diagram illustrating a further detailed configuration of a unit block tweakable encryption unit illustrated in FIG. 1.

FIG. 2 is an explanatory diagram illustrating a further detailed configuration of the unit block tweakable encryption module 101 illustrated in FIG. 1. The unit block tweakable encryption module 101 is configured by an AES encryptor 101a, a temporary key generator 101b, and a block encryptor 101c. The AES encryptor 101a encrypts (csr, gt, X[2], ..., X[d]) using a key K (encryption key 111) by the AES encryption method. The temporary key generator 101b generates a temporary key DK using a 128-bit output of the AES encryptor 101a. The block encryptor 101c encrypts X[1] utilizing the temporary key DK output from the temporary key generator 101b. The AES encryptor 101a and the temporary key generator 101b correspond to the above-described KeyGen, while the block encryptor 101c corresponds to BlockEnc.

KeyGen is a function that generates DK indicated in the following Formula 5 using the 128-bit AES output. However, when i=0, ..., 9, K10Key [i] is required to be a non-negative integer and almost uniformly distributed in an integer set {0, ..., 9}. K10Key [0] is always 0.

$$DK=(K10\text{Key}[0],K10\text{Key}[1],\ldots,K10\text{Key}[9]) \quad \text{[Formula 5]}$$

Assuming that the 128-bit AES output is a uniform random number, K10Key[i] distributed as above can be generated by processing indicated in the following Formula 6. The 128-bit AES output actually uses the first 64 bits and the last 8 bits of the output, which are respectively defined as B, W. Further, when a and b are both positive integer, a/b is defined as a÷b, the i-th bit of W is defined as W(i); and the i-th to j-th bit sequence is defined as W (i, j). Then, the first operation of Formula 6 to a binary sequence B is a remainder calculation where B is assumed as integers from 0 to 2^64-1. "Bth power of A" is indicated herein as "A^B" in other part than Formulas.

$$V \leftarrow B \bmod 14175$$

$$\alpha \leftarrow W$$

$$\beta_i \leftarrow ((V \bmod 81) \bmod 3^{4-(i-1)})/3^{3-(i-1)} \text{ for } i=1,2,3,4$$

$$\gamma_j \leftarrow ((V \bmod 25) \bmod 5^{2-(j-1)})/5^{1-(j-1)} \text{ for } j=1,2$$

$$\delta \leftarrow V \bmod 7$$

$$K10\text{Key}[9] \leftarrow \alpha_{(1)}*5+\gamma_1$$

$$K10\text{Key}[8] \leftarrow \beta_1*3+\beta_2$$

$$K10\text{Key}[7] \leftarrow \alpha_{(2,4)}$$

$$K10\text{Key}[6] \leftarrow \delta$$

$$K10\text{Key}[5] \leftarrow \alpha_{(5)}*3+\beta_3$$

$$K10\text{Key}[4] \leftarrow \gamma_2$$

$$K10\text{Key}[3] \leftarrow \alpha_{(6,7)}$$

$$K10\text{Key}[2] \leftarrow \beta_4$$

$$K10\text{Key}[1] \leftarrow \alpha_{(8)}$$

$$K10\text{Key}[0] \leftarrow 0 \quad \text{[Formula 6]}$$

In Formula 6, βi corresponds to a ternary expansion of V mod 81, and γj corresponds to a quinary expansion of V mod 25. Considering the above, 14175=(3^4)×(5^2)×7, and Chinese Remainder Theorem, V indicated in the following Formula 7 corresponds to (β1, ..., β4, γ1, γ2, δ) in one-to-one. Further, since W takes all 28-pattern values, (V, W) and (K10Key[0], K10Key[9]) become one-to-one correspondence.

$$V \in Z_{14175}(Z: \text{Integer set }\{0, \ldots, 1, 14174\})$$

As such, when (V, W) is an uniform random number in an integer set Z indicated in Formula 7, each element of K10Key[i] becomes an independent uniform random number. When AES is a random function, B and W are independent uniform random numbers, thus, the average distance between V and uniform random numbers in the integer set Z is calculated as indicated in the following Formula 8. Therefore, K10Key is close to a uniform random number to the extent of no practical problem.

$$14175/4*2^{64}<1/2^{51} \quad \text{[Formula 8]}$$

Next, the block encryptor 101c, that is, the actual processing of BlockEnc, will be considered. BlockEnc realizes a uniform random permutation in Z10=Integer set {0, ..., 9} using DK=(K10Key[0], ..., K10Key[9]) that is output from the above-described KeyGen as a key. When x∈Z10 is an input and DK=(K10Key[0], ..., K10Key[9]) is a key, a method called Knuth Shuffle, also known as Fisher-Yates Shuffle (NPL2), indicated in the following Formula 9, can be utilized as BlockEnc.

1. Initially set array[0]=0, ..., array[9]=9

2. Define $j=K10\text{Key}[i]$ where $i=9, \ldots, 1$, and exchange values of array[i] and array[j].

3. With input value $x \in Z_{10}$, output $y$ where $y$=array[$x$] by the obtained array. [Formula 9]

So far, a method of configuring KeyGen and BlockEnc using AES when a=10 (that is, decimal) has been described. When a is a value other than 10, the processing may be performed by defining DK=(K10Key[0], ..., K10Key[a-1]), configuring KeyGen so that K10Key[i] is almost uniformly distributed in an integer set {0, ..., i}, and replacing 9 of Formula 9 with a-1.

While KeyGen can be realized by defining as Formula 6, KeyGen can be expressed, more simply, as indicated in the following Formula 10, for example, utilizing a partial sequence Seq[i] of a predetermined length, with which the AES output is sufficiently long.

$$K10\text{Key}[i]=\text{Seq}[i] \bmod (i+1) \quad \text{[Formula 10]}$$

(Block Permutation Unit)

Figure 3:
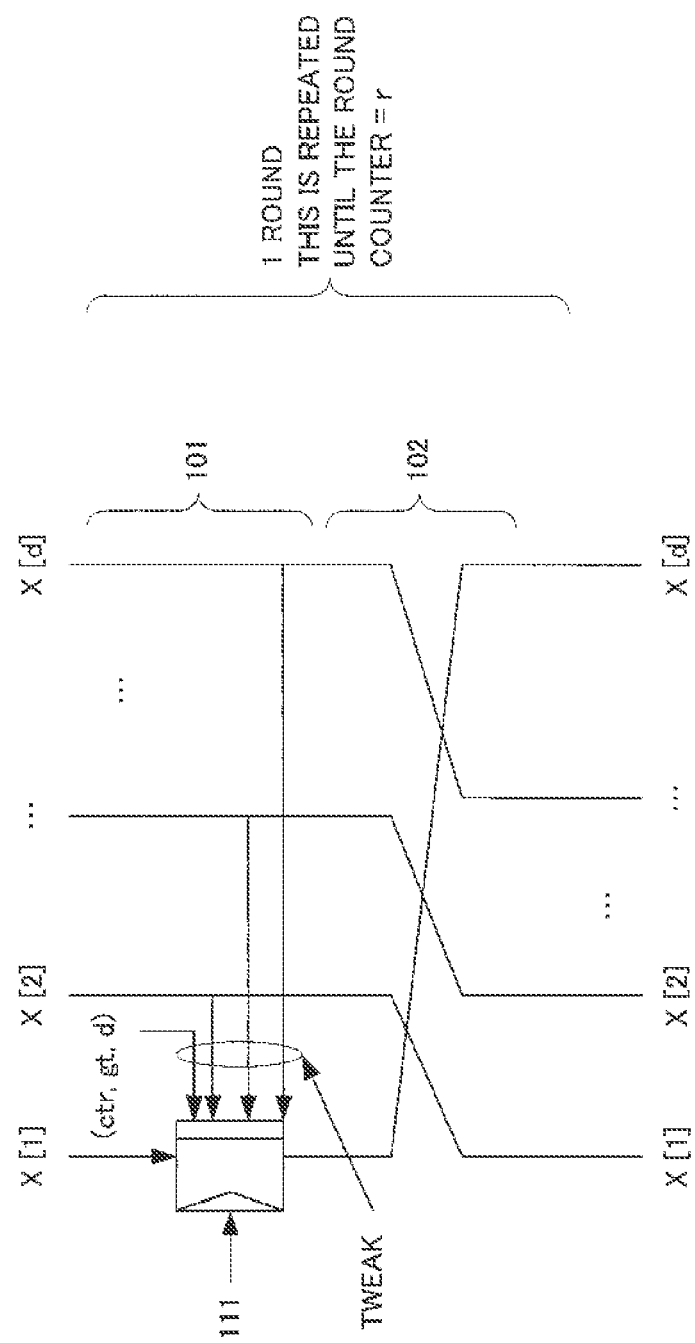
FIG. 3 is an explanatory diagram illustrating processing to be performed by a block permutation unit illustrated in FIG. 1.

FIG. 3 is an explanatory diagram illustrating processing that is performed by the block permutation module 102 illustrated in FIG. 1. The block permutation module 102 performs permutation (shuffle) processing per d-number of characters. This permutation processing may use, for example, a left cyclic shift as indicated in the following Formula 11 or a right cyclic shift that permutates respective data in the reverse direction. However, permutation where the input is totally the same as the output (identity permutation) should not be used for a security reason.

$$\text{LeftRot}(V, X[2], X[3], \ldots, X[d]) = (X[2], X[3], \ldots, X[d], V)$$ [Formula 11]

The counter update module 103 compares the input round counter value with a preliminary given value r, and, when the round counter value<r, increments the round counter value by one. Then, the counter update module 103 inputs the d-digit value in base a that is output from the block permutation module 102 to the unit block tweakable encryption module 101. When the round counter value=r, the counter update module 103 outputs the output value of the block permutation module 102 to the output unit 14 as a cipher text.

An operation of the block permutation module 102 when the round counter value=r does not determine security of encryption. As such, when the round counter value=r, the counter update module 103 may output the latest output from the unit block tweakable encryption module 101, as is, as a cipher text. Such a case corresponds to applying reverse permutation to the output value of the block permutation module 102 and outputting the outcome.

Figure 4:
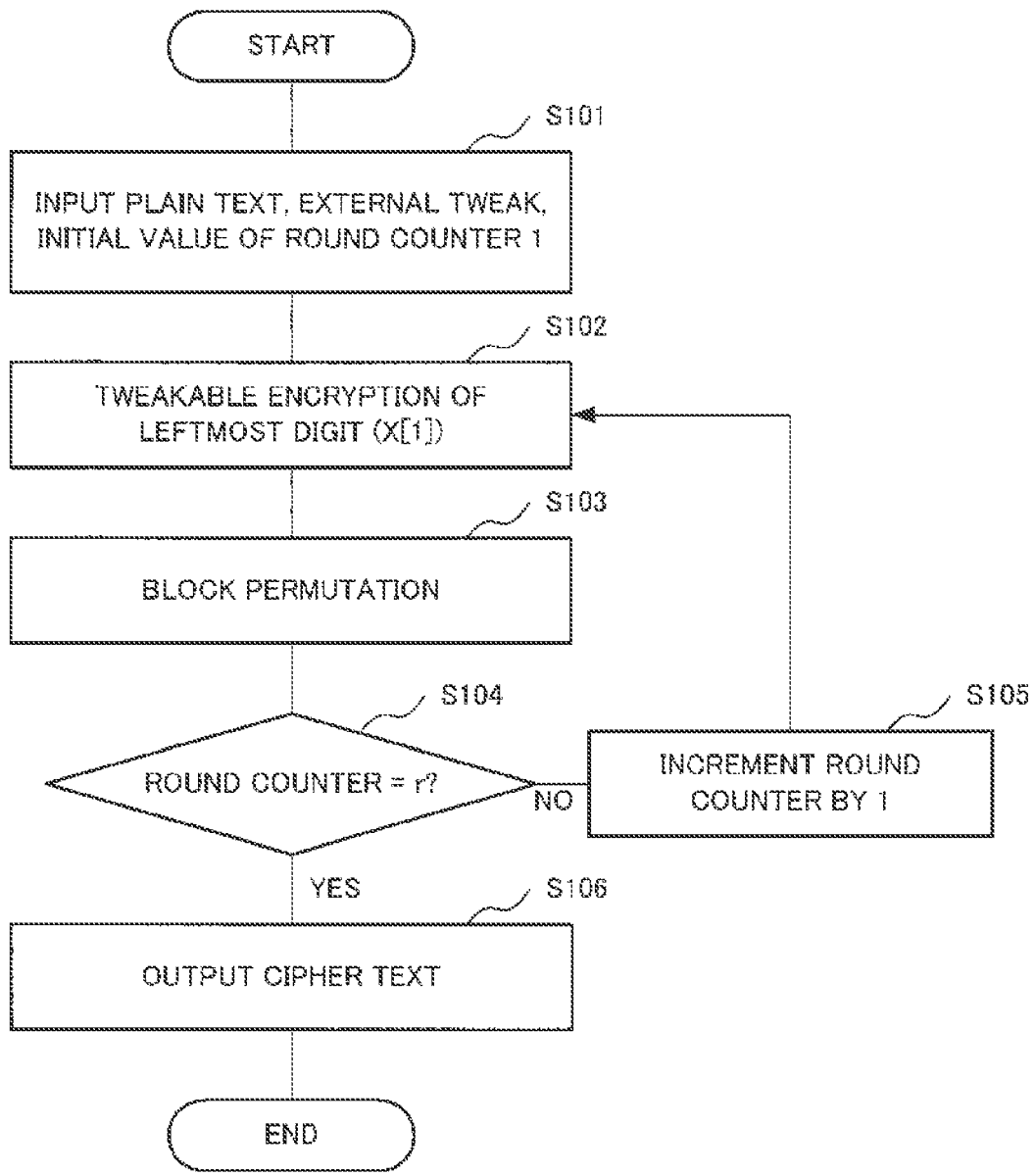
FIG. 4 is a flowchart illustrating an operation of an encryption device illustrated in FIG. 1.

FIG. 4 is a flowchart illustrating an operation of the encryption device 10 illustrated in FIG. 1. When a d-digit plain text in base a as a target of encryption, an external tweak, and an initial value of a round counter=1 are input via the input unit 13 (step S101), the unit block tweakable encryption module 101 operates encryption indicated in Formula 3 to X[1], concatenates the output value V with X[2], ..., X[d], and outputs (V, X[2], ..., X[d]) (step S102). For X[1], relationship indicated in the following Formula 12 is established.

$$x[1] \in Z_{(ctr-1 \bmod d)+1}$$ [Formula 12]

Next, the block permutation module 102 performs block permutation processing, such as a left cyclic shift and a right cyclic shift, for (V, X[2], ..., X[d]) that is output from the unit block tweakable encryption module 101 (step S103).

Then, the counter update module 103 determines whether or not the round counter value is equal to the preliminary given value r (step S104). When the round counter value<r, the round counter value is incremented by one (step S105) and the processing returns to step S102. When the round counter value=r, the output value from the block permutation module 102 is output to the output unit 14 as a cipher text (step S106) and the processing completes.

(Configuration of Decryption Device)

Returning to FIG. 1, the processor 21 of the decryption device 20 operates as an unit block tweakable decryption module 201, a block reverse permutation module 202, and a counter update module 203 respectively, as will be described later herein, by an operation of a decryption program.

Further, the storage unit 22 prestores a decryption key 211. The decryption key 211 may be anything as long as a cipher text encrypted using the encryption key 111 can be decrypted. For example, the encryption key 111 may be a private key in the public key encryption method, and the decryption key 211 may be a public key corresponding to the private key, or vice versa. Alternatively, the encryption device 10 and decryption device 20 may be the same computer, and the encryption key 111 and decryption key 211 may be the same common key.

The unit block tweakable decryption module 201 and the block reverse permutation module 202 respectively perform reverse operation of the unit block tweakable encryption module 101 and the block permutation module 102 of the encryption device 10.

Through the input unit 23, a d-digit cipher text in base a as a target of decryption, an external tweak, and an initial value of a round counter=1 are input. The same relationship as the above-described Formula 1 is established between a(i) and a message space MSG. In other words, the message space MSG is a d-digit space in base a.

The unit block tweakable decryption module 201 performs decryption processing corresponding to the unit block tweakable encryption module 101. When a decryption function corresponding to the encryption function TE as indicated in Formula 2 is defined as TD (the definition of respective signs is the same as Formula 2), the decryption function TD is indicated in the following Formula 13. The relationship indicated in Formula 13 needs to be established for all K, T, and C.

$$M = TD(K, T, C)$$ [Formula 13]

As illustrated in FIG. 2, when the encryption function TE of the unit block tweakable encryption module 101 is configured by KeyGen and BlockEnc indicated in the above-described Formula 4, the decryption function TD of the unit block tweakable decryption module 201 is also configured by the same KeyGen and BlockDec that performs reverse permutation of Knuth Shuffle. The processing of BlockDec is indicated in the following Formula 14.

1. Initially set array[0]=0, ..., array[9]=9

2. Define $j=K10\text{Key}[i]$ where $i=9, \ldots, 1$, and exchange values of array[$j$] and array[$i$].

3. With input value $y \in Z_{10}$, output $x$ where $y=\text{array}[x]$ by the obtained array. [Formula 14]

The block reverse permutation module 202 performs permutation (shuffle) processing per d-number of characters. Further, the block reverse permutation module 202 is a reverse function to the block permutation module 102. For example, when the block permutation module 102 uses a left cyclic shift, the block reverse permutation module 202 uses a right cyclic shift. Then, an operation of the counter update module 203 is the same as the counter update module 103.

Figure 5:
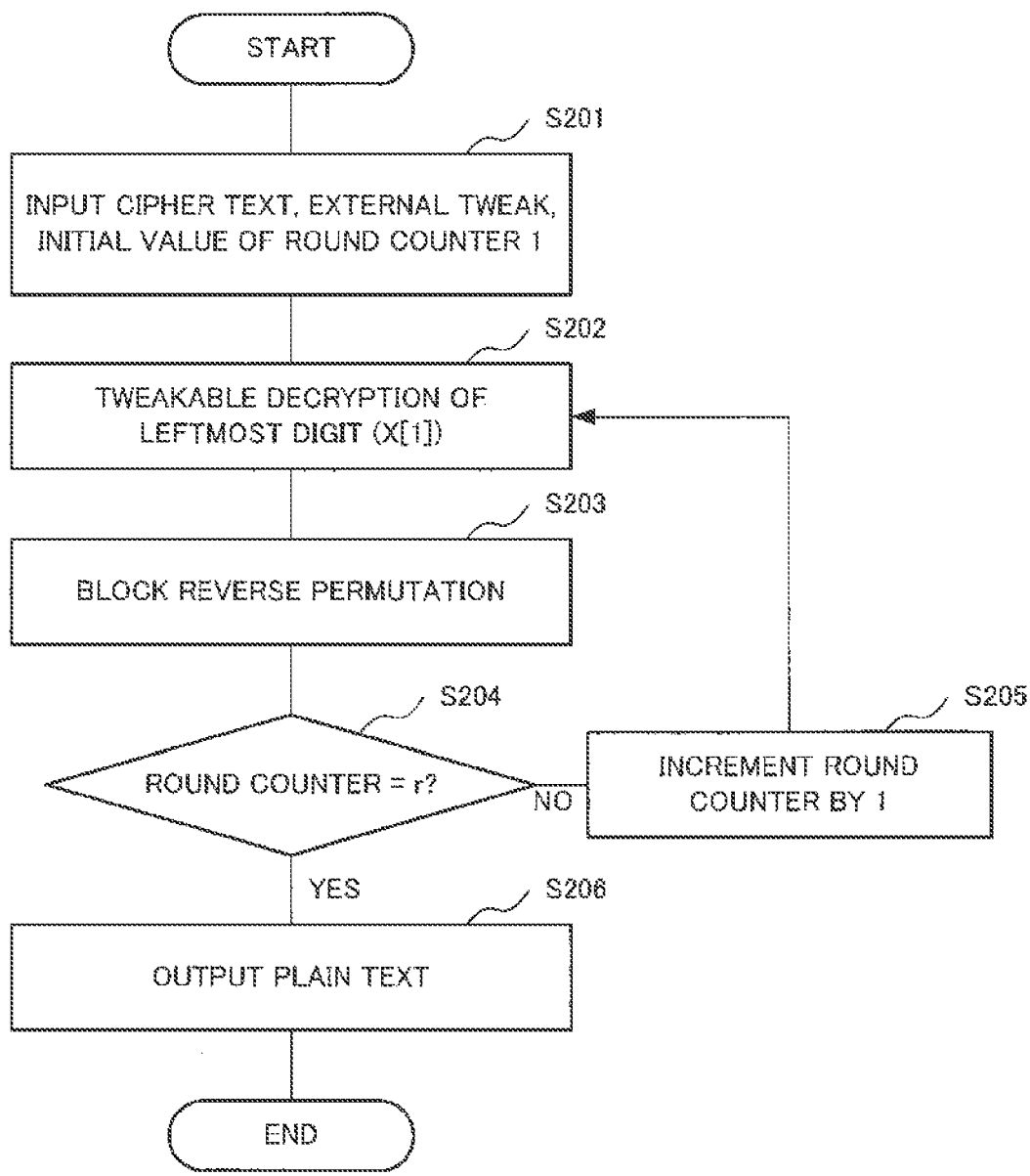
FIG. 5 is a flowchart illustrating an operation of a decryption device illustrated in FIG. 1.
Figure 6:
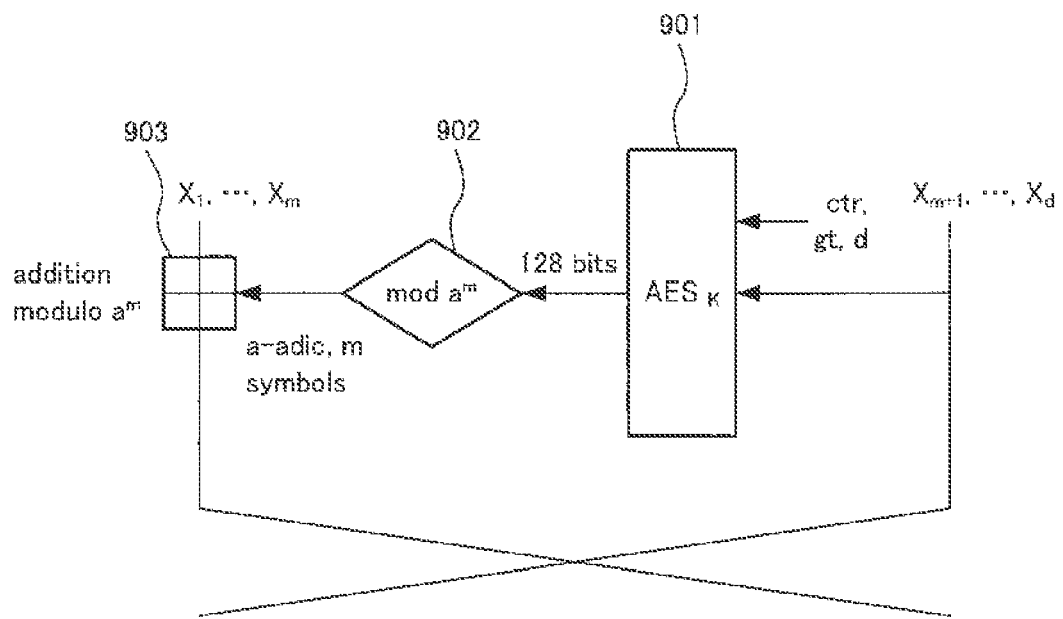
FIG. 6 is an explanatory diagram illustrating an overview of an encryption method described in NPL6.

FIG. 5 is a flowchart illustrating an operation of the decryption device 20 illustrated in FIG. 1. When a d-digit plain text in base a as a target of decryption (output from the encryption device 10), an external tweak, and an initial value of a round counter=1 are input via the input unit 23 (step S201), the unit block tweakable decryption module 201 operates decryption that is reverse to step S101 of FIG. 4 for X[1], concatenates the output value V with X[2], ..., X[d], and outputs (V, X[2], ..., X[d]) (step S202).

Next, the block reverse permutation module 202 performs block permutation processing that is a reverse direction of the block permutation module 102 (that is, block reverse permutation processing) for (V, X[2], ..., X[d]) output from the unit block tweakable decryption module 201 (step S203).

Then, the counter update module 203 determines whether or not the round counter value is equal to the preliminary given value r (step S204). When the round counter value<r, the round counter value is incremented by one (step S205) and the processing returns to step S202. When the round counter value=r, the output value from the block permutation module 202 is output to the output unit 24 as a plain text (step S206) and the processing completes.

Overall Operation of the Embodiment

Next, the overall operation of the above-described exemplary embodiment will be described. The format-preserving encryption method according to the exemplary embodiment is a method in which the format-preserving encryption device 10 performs the following processing. That is, the format-preserving encryption device 10 encrypts an input plain text and outputs a cipher text in the same data format as the plain text. The unit block tweakable encryption unit encrypts a leftmost digit of the plain text by using numerical values of the remaining respective digits excluding the leftmost digit of the plain text and an external tweak that is input concurrently with the plain text (step S102 of FIG. 4). The block permutation unit performs permutation per digit based on a predetermined rule for the remaining respective digits excluding the leftmost digit of the plain text and the encrypted leftmost digit of the plain text (step S103 of FIG. 4). The counter update unit causes processing of encryption of the leftmost digit of the plain text and permutation per digit to repeat for a predetermined number of times (steps S104 and S105 of FIG. 4).

Further, the format-preserving decryption method according to the exemplary embodiment is a method in which the format-preserving decryption device 20 performs the following processing. That is, the format-preserving decryption device 20 decrypts an input cipher text and outputs a plain text in the same data format as the cipher text. The unit block tweakable decryption unit decrypts a leftmost digit of the cipher text by using numerical values of remaining respective digits excluding the leftmost digit of the cipher text and an external tweak that is input concurrently with the cipher text (step S202 of FIG. 5). The block reverse permutation unit performs reverse permutation per digit based on a predetermined rule for the remaining respective digits excluding the leftmost digit of the cipher text and the decrypted leftmost digit of the cipher text (step S203 of FIG. 5). The counter update unit causes processing of decryption of the leftmost digit of the cipher text and reverse permutation per digit to repeat for a predetermined number of times (steps S204 and S205 of FIG. 5).

The above-described respective operation steps may be programmed so as to be executable by a computer, which may be executed by the format-preserving encryption device 10 and decryption device 20 that are computers for directly executing the respective steps. The program may be stored in a non-transitory recording medium, such as DVD, CD, and Flash memory. In such a case, the program is loaded from a recording medium by a computer, and is executed.

By such an operation, the exemplary embodiment provides the following effects.

According to the exemplary embodiment, encryption/decryption processing is made possible regardless of the number of digits and even in other number than binary, utilizing a block cipher method that is operated with high security to a binary space.

In the above-described method, since block encryption is always performed for a leftmost digit of a d-digit plain text using the remaining d-1 digits as a part of a tweak, the input of each round always influences the leftmost digit. Since the round structure has a reverse function, the entire processing also has a reverse function. Thus, a block cipher for the message space MSG indicated in Formula 1 can be formed.

As for security of this method, when the tweakable encryption that uses, as a block, one digit in base $a(i)$ that is used as a component is secure (i=1, . . . , d), by repeating the encryption for 2d times, the method is proved to be theoretically secure for a chosen plain text attack of the number of times that is sufficiently smaller than $|MSG|^{(d/2)}$. Further, by increasing the repetition to 3d times, the method is proved to be theoretically secure for a chosen cipher text attack of the number of times that is sufficiently smaller than $|MSG|^{(d/2)}$. Here, $|MSG|$ is a size of a message space MSG.

Then, when $a(i)$ is small, the tweakable block cipher with one digit in base $a(i)$ as a block can be theoretically securely formed by combining a general block cipher and Knuth Shuffle on $Za(i)$.

It will be appreciated that the unit block tweakable encryption module 101 may encrypt a digit other than $X[1]$, that is, a digit other than the first digit of the plain text, and the block permutation module 102 may permutate respective data based on a rule other than a left cyclic shift and a right cyclic shift. Even in such a case, the unit block tweakable decryption module 201 and the block reverse permutation module 202 respectively perform reverse processing of the unit block tweakable encryption module 101 and the block permutation module 102.

Expansion of Embodiment 1

Various expansions of the above-described exemplary embodiment will be considered without changing the spirit thereof. The following will describe such expansions.

When a value of a is large to a certain extent in a d-digit message space in base a, utilizing Knuth Shuffle as actual processing of the block encryptor 101c, that is, BlockEnc, is inefficient and unpractical.

In such a case, for example, a method described in NPL10 can be used. Further, particularly, when a=232, 248, and the like, methods that use small block sizes may be utilized among existing block ciphers, such as KATAN described in NPL11, RC5 described in NPL12, and SEA described in NPL13.

Even in such a case, processing of the block encryptor 101c (BlockEnc) still utilizes the output from the temporary key generator 101b (a temporary key DK that is output from KeyGen). However, the output from the AES encryptor 101a is required to be converted to a key in a format and distribution that is required by the block encryptor 101c. Since the key has to be a binary format in any of the methods described in NPL10, 11, and 13, the temporary key generator 101b may shorten the output from the AES encryptor 101a to an appropriate length and output the outcome to the block encryptor 101c.

Further, when the block encryptor 101c requires a key of a length of 128 bits or more, the temporary key generator 101b may expand the output from the AES encryptor 101a by a known technique Output Feedback Mode (OFB) and output the outcome to the block encryptor 101c. Further, depending on a condition such as a length of an external tweak, when a sequence concatenating a round counter, an external tweak, the number of digits d, and $X[1], \ldots, X[d]$ becomes 128 bits or more, an input length of the temporary key generator 101b may be expanded utilizing a general encryption use mode such as a known technique Cipher Block Chaining Message Authentication Code (OBC-MAC).

Expansion of Embodiment 2

In a d-digit message space in base a, a for each digit may be different in some cases. Such a case corresponds to, for example, a case of dealing with data such as "a combination of binary and decimal" as described in Background Art. A value of a of the i-th digit (i=1, ..., d) is represented as a(i). A space that X[1] may take in the j-th round (j=1, ..., d) is indicated in the following Formula 15.

$$Z_{a(j-1 \bmod d)+1)}$$ [Formula 15]

In such a case, an array size of Knuth Shuffle and a block size of a block cipher that are used in processing of the block encryptor 101c in the j-th round become equal to those indicated in Formula 15. In other words, since the processing of the block encryptor 101c cyclically changes for each round, processing of the AES encryptor 101a and the temporary key generator 101b cyclically changes accordingly.

Further, even in a case that a(i) of respective digits are not the same, when the number of rounds r is integral multiple of the number of digits d, processing of the block permutation module 102 and the counter update module 103 may be the same as the above-described exemplary embodiment. Formats of a plain text and a cipher text need to match after processing for r rounds, and such a condition is satisfied when the block permutation module 102 performs a left (or right) cyclic shift in a condition where the number of rounds r is integral multiple of the number of digits d. In other cases, the block permutation module 102 is required to apply different permutation only when the round counter is r.

In both expansion 1 and 2 of the exemplary embodiment as described above, the decryption device 20 performs a reverse operation to the above-described encryption device 10.

While, so far, a specific exemplary embodiment illustrated in the drawings has been described regarding the present invention, the present invention is not limited to the exemplary embodiment illustrated therein. The present invention can be applied to any known configurations as long as the present invention can provide the effects thereof.

Main points of new technical contents for each exemplary embodiment as described above are as follows. Note that the following summarizes part or whole of the above-described exemplary embodiment as a new technique, however, the present invention is not limited thereto.

(Supplementary Note 1)

A format-preserving encryption device that encrypts an input plain text and outputs a cipher text in a same data format as the plain text, including:

unit block tweakable encryption means for encrypting a specific digit of the plain text by using numerical values of remaining respective digits excluding the specific digit of the plain text and an external tweak that is input concurrently with the plain text;

block permutation means for permutating respective digits including the encrypted specific digit of the plain text per digit based on a predetermined rule; and encryption counter update means for causing processing by the unit block tweakable encryption means and block permutation means to repeat for a predetermined number of times.

(Supplementary Note 2)

The format-preserving encryption device according to Supplementary Note 1, wherein the unit block tweakable encryption means includes:

an AES encryptor that encrypts a numerical value that concatenates remaining respective digits excluding the specific digit of the plain text and the external tweak using a prestored encryption key and outputs an output value of a specific number of bits;

a temporary encryption key generator that generates a temporary encryption key using an output value of the AES encryptor; and a block encryptor that encrypts the specific digit of the plain text utilizing the temporary encryption key.

(Supplementary Note 3)

The format-preserving encryption device according to Supplementary Note 2, wherein the block encryptor encrypts the specific digit of the plain text by permutation using Knuth Shuffle.

(Supplementary Note 4)

The format-preserving encryption device according to Supplementary Note 1, wherein the block permutation means carries remaining respective digits excluding a leftmost digit of the plain text by one digit, and moves the leftmost digit of the plain text to a rightmost position.

(Supplementary Note 5)

A format-preserving decryption device that decrypts a cipher text that is output from the format-preserving encryption device according to any one of Supplementary Notes 1 to 4 and outputs a plain text in a same data format as the cipher text, including:

unit block tweakable decryption means for decrypting a specific digit of the cipher text, which is at a same position as the unit block tweakable encryption unit, by using numerical values of remaining respective digits excluding the specific digit of the cipher text and an external tweak that is same as the encryption device and is input concurrently with the cipher text;

block reverse permutation means for permutating respective digits including the decrypted specific digit of the cipher text per digit based on a reverse rule to the block permutation unit; and decryption counter update means for causing processing by the unit block tweakable decryption means and the block reverse permutation means to repeat for a same number of times as the encryption counter update means.

(Supplementary Note 6)

The format-preserving decryption device according to Supplementary Note 5, wherein the unit block tweakable decryption means includes:

an AES decryptor that decrypts a numerical value that concatenates remaining respective digits excluding the specific digit of the cipher text and the external tweak using a prestored decryption key and outputs an output value of a specific number of bits;

a temporary decryption key generator that generates a temporary decryption key using an output value of the AES decryptor; and a block decryptor that decrypts the specific digit of the cipher text utilizing the temporary decryption key.

(Supplementary Note 7)

The format-preserving decryption device according to Supplementary Note 6, wherein the block decryptor decrypts the specific digit of the cipher text by reverse permutation using Knuth Shuffle.

(Supplementary Note 8)

The format-preserving decryption device according to Supplementary Note 5, wherein the block permutation means carries remaining respective digits excluding a rightmost digit of the plain text by one digit, and moves the rightmost digit of the plain text to a leftmost position.

(Supplementary Note 9)

A format-preserving encryption method of a format-preserving encryption device that encrypts an input plain text and outputs a cipher text in a same data format as the plain text, including:

encrypting, by unit block tweakable encryption means, leftmost digit of the plain text by using numerical values of remaining respective digits excluding the leftmost digit of the plain text and an external tweak that is input concurrently with the plain text;

permutating, by block permutation means, remaining respective digits excluding the leftmost digit of the plain text and the encrypted leftmost digit of the plain text per digit based on a predetermined rule; and causing, by counter update means, processing of the encryption of a leftmost digit of the plain text and the permutation per digit to repeat for a predetermined number of times.

(Supplementary Note 10)

A format-preserving decryption method of a format-preserving decryption device that decrypts an input cipher text and outputs a plain text in a same data format as the cipher text, including:

decrypting, by unit block tweakable decryption means, a leftmost digit of the cipher text by using numerical values of remaining respective digits excluding the leftmost digit of the cipher text and an external tweak that is input concurrently with the cipher text;

reverse permutating, by block reverse permutation means, remaining respective digits excluding the leftmost digit of the cipher text and the decrypted leftmost digit of the cipher text per digit based on a predetermined rule; and causing, by counter update means, processing of the decryption of a leftmost digit of the cipher text and the reverse permutation per digit to repeat for a predetermined number of times.

(Supplementary Note 11)

A format-preserving encryption program, in a format-preserving encryption device that encrypts an input plain text and outputs a cipher text in a same data format as the plain text, causing a computer provided in the format-preserving encryption device to execute procedures of:

encrypting a leftmost digit of the plain text by using numerical values of remaining respective digits excluding the leftmost digit of the plain text and an external tweak that is input concurrently with the plain text;

permutating remaining respective digits excluding the leftmost digit of the plain text and the encrypted leftmost digit of the plain text per digit based on a predetermined rule; and causing processing of the encryption of a leftmost digit of the plain text and the permutation per digit to repeat for a predetermined number of times.

(Supplementary Note 12)

A format-preserving decryption program, in a format-preserving decryption device that decrypts an input cipher text and outputs a plain text in a same data format as the cipher text, causing a computer provided in the format-preserving decryption device to execute procedures of:

decrypting a leftmost digit of the cipher text by using numerical values of remaining respective digits excluding the leftmost digit of the cipher text and an external tweak that is input concurrently with the cipher text;

reverse permutating remaining respective digits excluding the leftmost digit of the cipher text and the decrypted leftmost digit of the cipher text per digit based on a predetermined rule; and causing processing of the decryption of a leftmost digit of the cipher text and the reverse permutation per digit to repeat for a predetermined number of times.

This application claims priority based on Japanese Patent Application No. 2012-098403 filed on Apr. 24, 2012, which application is incorporated herein in its entirety by disclosure.

INDUSTRIAL APPLICABILITY

The present invention is widely applicable to usages of adding a data encryption/decryption function to a business system or a database in which a data format is predetermined. The present invention is not only effective for the above-described example of a credit card number, but also effective, for example, for encryption of RFID tag data (a standard length of 96 bits, which is shorter than 128 bits in AES).

REFERENCE SIGNS LIST 1 encryption system
10 encryption device
11, 21 processor
12, 22 storage unit
13, 23 input unit
14, 24 output unit
20 decryption device
101 unit block tweakable encryption module
101a aes encryptor
101b temporary key generator
101c block encryptor
102 block permutation module
103, 203 counter update module
111 encryption key
201 unit block tweakable decryption module
202 block reverse permutation module
211 decryption key

The invention claimed is:

1. A computer-implemented apparatus that encrypts an input plain text and outputs a cipher text in a same data format as the plain text, comprising:
 a processor; and
 a memory storing instructions to be executed by the processor by causing the processor to execute:
 an unit block tweakable encryption unit configured to encrypt a specific digit of the plain text by using numerical values of remaining respective digits excluding the specific digit of the plain text and an external tweak that is input concurrently with the plain text;
 a block permutation unit configured to permutate respective digits including the encrypted specific digit of the plain text per digit based on a predetermined rule; and
 an encryption counter update unit configured to cause processing by the unit block tweakable encryption unit and the block permutation unit to repeat for a predetermined number of times;
 wherein the unit block tweakable encryption unit includes:
 an AES encryptor that encrypts a numerical value that concatenates remaining respective digits excluding the specific digit of the plain text and the external tweak using a prestored encryption key and outputs an output value of a specific number of bits;
 a temporary encryption key generator that generates a temporary encryption key using an output value of the AES encryptor; and
 a block encryptor that encrypts the specific digit of the plain text utilizing the temporary encryption key.

2. The format-preserving encryption device according to claim 1, wherein the block encryptor encrypts the specific digit of the plain text by permutation using Knuth Shuffle.

3. The format-preserving encryption device according to claim 1, wherein the block permutation unit of the encryption device carries remaining respective digits excluding a leftmost digit of the plain text by one digit, and moves the leftmost digit of the plain text to a rightmost position.

4. A format-preserving decryption device that decrypts a cipher text that is output from the format-preserving encryption device according to claim 1 and outputs a plain text in a same data format as the cipher text, comprising:
an unit block tweakable decryption unit for decrypting a specific digit of the cipher text, which is at a same position as the unit block tweakable encryption unit, by using numerical values of remaining respective digits excluding the specific digit of the cipher text and an external tweak that is same as the encryption device and is input concurrently with the cipher text;
a block reverse permutation unit for permutating respective digits including the decrypted specific digit of the cipher text per digit based on a reverse rule to the block permutation unit; and
a decryption counter update unit for causing processing by the unit block tweakable decryption unit and the block reverse permutation unit to repeat for a same number of times as the encryption counter update unit.

5. The format-preserving decryption device according to claim 4, wherein
the unit block tweakable decryption unit includes:
an AES decryptor that decrypts a numerical value that concatenates remaining respective digits excluding the specific digit of the cipher text and the external tweak using a prestored decryption key and outputs an output value of a specific number of bits;
a temporary decryption key generator that generates a temporary decryption key using an output value of the AES decryptor; and
a block decryptor that decrypts the specific digit of the cipher text utilizing the temporary decryption key.

6. A format-preserving encryption method of a format-preserving encryption device comprising a processor and a memory that encrypts an input plain text and outputs a cipher text in a same data format as the plain text, the memory storing instructions to be executed by the processor, thereby causing the processor to execute the method, the method comprising:
encrypting, by an unit block tweakable encryption unit, a specific digit of the plain text by using numerical values of remaining respective digits excluding the specific digit of the plain text and an external tweak that is input concurrently with the plain text;
permutating, by a block permutation unit, respective digits including the encrypted specific digit of the plain text per digit based on a predetermined rule;
causing, by an encryption counter update unit, processing of the encryption of a specific digit of the plain text and the permutation per digit to repeat for a predetermined number of times;
encrypting, by an AES encryptor, a numerical value that concatenates remaining respective digits excluding the specific digit of the plain text and the external tweak using a prestored encryption key and outputting an output value of a specific number of bits;
generating a temporary encryption key using an output value of the AES encryptor; and
encrypting the specific digit of the plain text utilizing the temporary encryption key.

7. A format-preserving decryption method of a format-preserving decryption device comprising a processor and a memory that decrypts an input cipher text and outputs a plain text in a same data format as the cipher text, the memory storing instructions to be executed by the processor, thereby causing the processor to execute the method, the method comprising:
decrypting, by an unit block tweakable decryption unit, a specific digit of the cipher text by using numerical values of remaining respective digits excluding the specific digit of the cipher text and an external tweak that is input concurrently with the cipher text;
reverse permutating, by a block reverse permutation unit, respective digits including the decrypted specific digit of the cipher text per digit based on a predetermined rule;
causing, by a decryption counter update unit, processing of the decryption of a specific digit of the cipher text and the reverse permutation per digit to repeat for a predetermined number of times;
decrypting, by an AES decryptor, a numerical value that concatenates remaining respective digits excluding the specific digit of the cipher text and the external tweak using a prestored decryption key and outputting an output value of a specific number of bits;
generating a temporary decryption key using an output value of the AES decryptor; and
decrypting the specific digit of the cipher text utilizing the temporary decryption key.

8. A computer-implemented apparatus comprising a processor and a non-transitory computer readable storage medium storing instructions to be executed by the processor, the apparatus encrypting an input plain text and outputting a cipher text in a same data format as the plain text, the instructions causing the processor to execute procedures of:
encrypting a specific digit of the plain text by using numerical values of remaining respective digits excluding the specific digit of the plain text and an external tweak that is input concurrently with the plain text;
permutating respective digits including the encrypted specific digit of the plain text per digit based on a predetermined rule;
causing processing of the encryption of a specific digit of the plain text and the permutation per digit to repeat for a predetermined number of times;
encrypting, by an AES encryptor, a numerical value that concatenates remaining respective digits excluding the specific digit of the plain text and the external tweak using a prestored encryption key and outputting an output value of a specific number of bits;
generating a temporary encryption key using an output value of the AES encryptor; and
encrypting the specific digit of the plain text utilizing the temporary encryption key.

9. A computer-implemented apparatus comprising a processor and a non-transitory computer readable storage medium storing instructions to be executed by the processor decrypting an input cipher text and outputting a plain text in a same data format as the cipher text, the instructions causing the processor to execute procedures of:
decrypting a specific digit of the cipher text by using numerical values of remaining respective digits excluding the specific digit of the cipher text and an external tweak that is input concurrently with the cipher text;

reverse permutating respective digits including the decrypted specific digit of the cipher text per digit based on a predetermined rule;

causing processing of the decryption of a specific digit of the cipher text and the reverse permutation per digit to repeat for a predetermined number of times;

decrypting, by an AES decryptor, a numerical value that concatenates remaining respective digits excluding the specific digit of the cipher text and the external tweak using a prestored decryption key and outputting an output value of a specific number of bits;

generating a temporary decryption key using an output value of the AES decryptor; and decrypting the specific digit of the cipher text utilizing the temporary decryption key.

* * * * *